United States Patent [19]
Smith

[11] 4,163,712
[45] Aug. 7, 1979

[54] TREATMENT OF LIQUID

[75] Inventor: Kenneth C. Smith, Essex, England

[73] Assignee: BOC Limited, London, United Kingdom

[21] Appl. No.: 586,390

[22] Filed: Jun. 12, 1975

Related U.S. Application Data

[63] Continuation-in-part of Ser. No. 430,260, Jan. 3, 1974, abandoned.

[30] Foreign Application Priority Data

Jan. 8, 1973 [GB] United Kingdom .................. 1027/73
Mar. 1, 1973 [GB] United Kingdom ............... 10082/73
Jun. 26, 1973 [GB] United Kingdom ............... 30236/73

[51] Int. Cl.² ............................................. C02C 1/06
[52] U.S. Cl. .......................................... 210/7; 210/8; 210/44; 210/221 P; 210/63 Z; 261/DIG. 75; 261/29
[58] Field of Search ................. 210/44, 15, 63 Z, 3–8, 210/14, 194, 195, 221 P, 220, 198 R; 261/36 R, 28, 29, 121 R; 209/164, 170; 222/3

[56] References Cited

U.S. PATENT DOCUMENTS

| 3,444,076 | 5/1969 | Sekikawa et al. | 210/15 |
| 3,555,783 | 1/1971 | Grimshaw | 210/221 P |
| 3,662,890 | 5/1972 | Grimshaw | 210/15 |
| 3,772,187 | 11/1973 | Othmer | 210/8 |
| 3,794,582 | 2/1974 | Lackme et al. | 210/63 |
| 3,870,635 | 3/1975 | Clarke-Pounder | 210/221 P |

FOREIGN PATENT DOCUMENTS 940555 10/1963 United Kingdom ................. 210/221 P

*Primary Examiner*—Benoit Castel
*Attorney, Agent, or Firm*—Dennison, Dennison, Meserole & Pollack

[57] ABSTRACT

The invention relates to a system for treating liquid such as aqueous liquor with a gas that is sparingly soluble therein by introducing the gas into a pressurized stream of the liquid at a sufficient rate to dissolve some of the gas in the stream and additionally to form finely dispersed bubbles of undissolved gas which are carried within the stream. The velocity of the stream is sufficiently high to ensure that the bubbles do not combine to form a discrete vapor phase. The stream is introduced into a volume of the liquid under turbulent conditions so that the bubbles of undissolved gas are broken into even finer bubbles which either dissolve or are consumed in the liquid volume.

20 Claims, 7 Drawing Figures

TREATMENT OF LIQUID

This application is a Continuation In Part to my Application Ser. No. 430,260 filed Jan. 3, 1974, now abandoned.

FIELD OF THE INVENTION

This invention relates to the treatment of liquids, for example aqueous liquors, with a gas that is sparingly soluble therein. It is particularly concerned with aqueous waste material, particularly sewage, rivers, streams or other bodies or naturally flowing sources of water or water used in fish farming.

DESCRIPTION OF THE PRIOR ART

Conventional methods of treating sewage and similar effluents usually involves aerating the effluent. This encourages micro-organisms present in the incoming effluent or introduced with activated sludge to break down the offensive portions of the effluent into a form more fit for disposal. One disadvantage of these conventional methods is that a prolonged treatment is required.

Much research activity has been focused on improving the efficiency of sewage treatment. One important proposal has been to use oxygen instead of air in the treatment process. Treatment systems based on this proposal have, however, some drawbacks.

In some conventional methods using an oxygen-enriched gas difficulties have arisen in dissolving all the oxygen in the sewage being treated so that some of the gas escapes from the surface of the sewage. In such methods it has been proposed to recirculate the undissolved oxygen and to use closed, instead of open, treatment tanks. This adds considerably to the expense of installing a new plant based on oxygen treatment, or converting an existing plant to one suitable for an oxygen treatment. A further drawback is that undissolved oxygen will accumulate in the ullage space of the treatment tank and if any inflammable material such as petroleum is included in the sewage to be treated, there may be some risk of an explosion or fire.

British Pat. Specification No. 940 555 describes a method of and apparatus for aerating a body of liquid with air or oxygen. The method comprises pressurising a stream of the liquid so that a greater quantity of air or oxygen can be dissolved therein than in the unpressurised liquid, introducing air or oxygen at a rate at which all the air or oxygen so introduced is dissolved in the stream of liquid, and then combining the stream with the main body of liquid which is at a lower pressure so that as the pressure of the liquid in the stream drops, excess air or oxygen originally dissolved in the pressurised stream is liberated therefrom and dissolves in the main body of liquid. However since the amount of gas which can be dissolved in the stream is limited by the pressure of the stream, this method severely limits the amount of gas that can be carried into the main body of liquid in the pressurised stream unless the pressure of the stream is unduly high resulting in an excessive power consumption to operate the system. Typically, for economic operation the pressure of the stream of liquid should desirably not be greater than about 80 psig. Under such conditions the maximum solubility of oxygen in the stream at ambient temperature would be of the order of 50 to 60 parts per million (ppm). It would conceivably be possible to achieve supersaturation at this pressure of the order of 10%, i.e. up to about 65 ppm, but this could only be achieved in a practical system by pressurising the stream to an even higher initial pressure upstream of the point of introduction of the gas and this again would further increase the power consumption. In any case, we have found that there are many applications, particularly in sewage treatment and fish farming, in which a very much higher concentration of oxygen in the stream is required than can be supplied by the above described method operating at an economic power consumption.

U.S. Pat. No. 3,772,187 (Othmer) proposes a sewage treatment process in which the entire volume of the polluted water is pressurised before it is passed into a treatment tank. Oxygen is dissolved in the pressurised stream up to the solubility of the pressurised stream before it enters the treatment tank. The tank is either closed so that the pressure of the water in the tank can be maintained at the pressure of the pressurised stream, or is open in which case the tank must be extremely deep if loss of oxygen is to be avoided, for example of the order of 30 feet when the stream is pressurised to about 15 psig, so that the hydrostatic pressure at the point of introduction of the pressurised stream is not less than the pressure of the pressurised stream. In either case, the teaching of Othmer is to prevent a pressure drop occurring as the pressurised stream enters the treatment tank so that the solubility of the oxygen is not decreased. This method therefore requires either a closed treatment tank, with the aforesaid attendant disadvantages thereof, or an extremely deep treatment tank which can be open. It also requires the entire volume of the polluted water to be pressurised.

This method is therefore totally impractical for treating many open bodies of water, for example rivers, streams and indeed sewers, which cannot be pressurised as they must be treated in situ and not passed to a separate treatment tank. The Othmer method also relies on dissolving the oxygen in the pressurised stream which once again severely limits the amount of oxygen which can be carried in the stream into the main body of liquid to be treated.

One aim of the present invention is therefore to provide a process of providing and retaining within a body of liquid a gas which is sparingly soluble in the gas, which process can be performed under economic power operating conditions in open bodies of liquid without the recycling of any undissolved gas and without the need for a considerable hydrostatic head of the liquid.

SUMMARY OF THE INVENTION

Accordingly, the present invention provides a process for providing and dissolving within a body of liquid a gas which is sparingly soluble in the liquid, which process comprises the steps of:
(a) taking a stream of the liquid,
(b) pressurising the stream of liquid,
(c) passing the stream of pressurised liquid through a conduit into the body of liquid, which is at a substantially lower pressure than that of said stream whereby the liquid in the stream experiences a pressure drop when passing into the main body of liquid,
(d) introducing the gas into the conduit under turbulent conditions and at a rate to provide in the stream 100% to 1500% by weight of gas in excess of the equilibrium saturation value of said gas in said liquid at the pressure of said stream whereby to dissolve gas in the stream of liquid and additionally to form finely dispersed bubbles of undissolved gas which are carried within the stream of liquid, (e) maintaining the rate of flow of the liquid in the conduit at least at a minimum limiting value of about 6 feet per second below which the bubbles of undissolved gas carried in the stream will tend to combine to form a discrete vapour phase, and (f) introducing the stream containing dissolved gas and finely dispersed bubbles of undissolved gas into the body of liquid under turbulent conditions whereby the finely dispersed bubbles of undissolved gas are broken into even finer bubbles which either dissolve or are consumed within the body of liquid.

By introducing the gas into the pressurised stream of liquid so that in addition to dissolving a proportion of gas in the liquid undissolved gas is carried in the stream in the form of finely dispersed bubbles, we have discovered that a much higher quantity of gas can be successfully carried in the stream into the main body of liquid and dissolved therein without pressurising the body of liquid, than if the amount of gas carried in the stream is merely limited to that which can be dissolved in the stream as in the above described prior art methods. Therefore this high stream is not used merely as a dissolving agent as in the above described prior art proposals but rather as means for transporting a much higher concentration of gas. The dissolution of the majority of the gas occurs after it enters the main body of liquid through expansion jets whereby microbubbles of the undissolved gas in the pressurised stream are formed by turbulence and dissolve in the main body of the liquid.

The proportion of undissolved gas to dissolved gas carried in the stream will be in the range approximately 1:1 to 20:1.

Furthermore, in order to achieve an economic power consumption during operation the pressure of the stream should be within the range 0.3 to 200 psig, preferably in the range 20 to 80 psig, for example in the range 25 to 50 psig. For example for a pressure of 45 psig in the stream of liquid, it is possible in accordance with the invention to introduce up to 600 ppm of oxygen into the stream of which over nine-tenths is in the form of undissolved bubbles of oxygen, as against 40 ppm if the amount of oxygen introduced is limited to that which can be dissolved in the stream.

It is important that the undissolved gas remains in the form of finely dispersed bubbles which must not combine to create slug flow or rise to the surface of the liquid to form a stratified gas phase both of which conditions will prevent the undissolved gas from being carried into the main body of liquid in a form in which it can be readily dissolved or consumed in the main body of liquid. We have found that the velocity of the pressurised stream must be at or above a particular limiting value (sometimes known as the slug flow rate) in order to ensure that slagflow or stratification does not occur. This limiting value can be determined empirically for different systems and should be related to the size range of gas bubbles present, but we have found that in general the flow rate should not be lower than about 6 feet/sec. In general it is neither necessary nor desirable greatly to exceed such a minimum value.

The stream of pressurised liquid containing dissolved and undissolved gas enters the main body of water under turbulent conditions in order that the finely dispersed bubbles of undissolved gas are shattered into even finer bubbles of a size required to ensure that substantially all the gas dissolves in the main body of liquid. The precise size of the bubbles required to ensure that the gas dissolves before it reaches the liquid surface depends on several factors: the depth of the main body of liquid, the rate of movement, if any, of the body and the degree of turbulence of the body. We believe that in general the diameter of the bubbles in the conduit would typically be in the range 0.2mm to 2mm so that as they enter the main body of liquid at a relatively high velocity relative to any movement of the main body of water they are subjected to a shearing action that disperses the bubbles in the incoming stream into a multitude of even finer bubbles, typically having a diameter in the range of 0.01 to 0.15 mm which dissolve or are consumed in the main body of liquid before reaching its surface.

We have therefore provided a method of dissolving in a liquid a gas sparingly soluble therein, which permits much more gas to be retained in the body of the liquid than prior art methods operating with the same power consumption and without the need to pressurise the body of liquid, either by treatment in a closed pressure tank or in a deep open tank for example a wider range of polluted bodies of water can be treated by a method according to the invention.

Further Features and Uses of the Invention

The treatment process provided by the invention is applicable to a wide range of activities. It has primarily been developed for the dissolving of oxygen in aqueous liquors and most of the subsequent description is devoted to such dissolution. It can however also be applied to the introduction of other gases, for example of carbon-dioxide, and to the treatment of liquids other than water. It can for example be used in treating aqueous waste material, particularly sewage, either in sewage farms or in sewers, such as gravity or rising mains, in restoring the oxygen content of rivers, streams or bore-hole water, in enriching the oxygen content of water used in fish farming, in providing oxygen for aqueous liquors used to regenerate catalysts, and in the cultivation of yeast or pharmaceuticals such as penicillin. The liquors used in such procedures and in many others have an oxygen demand which can be readily satisfied by the procedure according to the invention. The procedure has the advantage that it achieves particularly high levels of dissolved oxygen in the liquor. Water from subterranean sources such as bore holes tends to deprived of dissolved oxygen and therefore to require oxygenation to make it more suitable for industrial or other purposes. Another characteristic of bore-hole water is that if often contains dissolved iron. The oxygenation process of this invention enables such dissolved iron to be precipitated and it can then be separated from the water by conventional means.

The stream of aqueous material into which the oxygenating gas is to be introduced can either be withdrawn from the volume to be treated or from an independent source. It should be at a superambient pressure which will generally need to be in the range 0.3 to 200 psig and in most instances will preferably be in the range 20 to 80 psig. Within these limits it is preferred, so as to converse power, to apply as little pressure as is required to achieve optimum operating condition for effectig the desired degree of solution. In some instances the aqueous material such as the effluent from certain chemical plants, will already be at an adequate elevated pressure. If the stream to be pressurised is withdrawn from a volume of aqueous material, it is convenient to use a single pump to effect both the withdrawal and pressurisation.

The term "oxygenating gas" employed herein includes any oxygen-containing gas mixture having an oxygen content greater than that of air. Thus it includes oxygen, oxygen-enriched air, ozonised oxygen or ozonised air. The oxygen content of the oxygenating gas is preferably at least 80% and is most preferably in excess of 98%. For large scale sewage treatment processes, it may be preferred to use oxygen-enriched air instead of oxygen and to compensate for the loss in efficiency of oxygen dissolution by using a higher pressure or by withdrawing the stream for oxygenation at a greater rate than would be required with pure oxygen. It is believed, however, that the use of oxygen-enriched air containing less than 65% by volume of oxygen will rarely be advantageous. The oxygenation gas can if desired include gases other than oxygen, for example chlorine, ozone or nitrous oxide. Standard techniques such as one or more jets, perforations or orifices may be used for introducing the oxygenating gas into the pressurised stream. Such techniques generally involve the creation of turbulent conditions at the region at which the oxygenating stream enters the pressurised stream. The velocity of the pressurised stream at this point is a main factor in determining the size of the bubbles of undissolved oxygenating gas in the oxygenated liquor stream.

A vaporiser fed from a source of liquid oxygen or a gas compressor fed from a source of gaseous oxygen or enriched air can be used to supply the oxygenating gas to the pressurised stream. The pressure of the oxygenating gas stream to be introduced into the pressurised stream will usually not need to be more than 10 psig above the pressure of the pressurised stream and can be less than that of the pressurised stream if a technique such as a venturi effect is employed. The introduction of oxygenating gas can be continuous or intermittent. The turbulence caused by the circulating liquid can be advantageous in ensuring mixing in the aqueous material. If desired the volume of oxygenating gas introduced in unit time can be controlled by providing a dissolved oxygen meter in the aqueous material to be treated and using the signal from the meter to regulate the input of the gas.

We have found that the velocity of aqueous liquor downstream of the point where the oxygenating gas is introduced should be related to the size of the bubbles of undissolved oxygenating gas in the oxygenated stream. Typically for bubbles of 2 mm diameter that velocity should be 2.5 meters per second.

The oxygenated stream can be introduced through one or more orifices or jets, a pipe with one or more orifices formed therein having been found to give satisfactory results. Introducing into the volume of material through such orifices or jets converts much of the energy of the pressurised stream into turbulence in the volume. The oxygenated stream enters the volume in the form of a jet or jets of liquid at a velocity of typically 40 feet per second and having a multitude of bubbles typically of 0.01 to 0.15 mm diameter entrained therein. We have found that the jet may extend into the liquid volume for a length of 10 meters or more.

We have also found that an orifice having a diameter in the range from 6 to 12 mm gives the required degree of turbulence if the stream to be oxygenated is at a pressure in the range 40 to 60 psig. However in some instances it is possible to use an orifice of smaller diameter.

By injecting the turbulent oxygenated stream into the aqueous material it is unnecessary to supply mechanical stirrers to help dissolve oxygen in the waste material contained in the treatment vessel. This is because sufficient agitation is caused by the introduction step. The turbulence, and thus the degree of shearing action, can if desired be enhanced by introducing the oxygenated stream into the aqueous material through a turbulence-inducing nozzle.

In some instances, for example as one of the options in fish farming, removal of a stream of aqueous liquor and its return to the treatment tank may be undertaken for a reason other than injection of oxygen. In fish farming it may be found desirable to pass the water from the fish tank through a filter and then return the filtered water to the tank. Although the oxygenation technique of the present invention can if desired be applied to the whole of such a withdrawn stream, it is generally found sufficient to take a minor stream from the main withdrawn stream, to pressurise the minor stream, to inject an oxygenating gas and to return the oxygenated stream either into the main withdrawn stream or directly into the treatment tank. In fish farming the minor stream is preferably 0.05 to 10% (by volume) of the stream withdrawn for filtration. It is preferably withdrawn from the main stream after the filtration. and is preferably returned directly to the treatment tank separate from the main stream. In general the main filtered stream is preferably reintroduced at the top of the fish tank and the oxygenated stream is preferably introduced at or near the base. Alternatively the oxygen can be introduced into a stream that has not been withdrawn from the volume of aqueous material to be treated. For instance, in fish farming, part or the whole of an incoming aqueous feed stream can be pressurised and oxygenated and then injected into the fish tank.

In introducing the oxygenated stream into the volume of aqueous material care must be taken not to damage any of the contents of the volume. Thus in a sewage treatment technique it is necessary to avoid damaging the activated sludge usually present. In fish farming it is necessary to avoid harming the fish. The risk of causing damage can be reduced by directing the introduced flow of oxygenated liquor in a direction that avoids the main bulk of material in the treatment tank or by guarding the liquor inlet with baffles or a barrier, typically a mesh barrier, or both. Similarly, in sewage plants using activated sludge it is desirable to avoid subjecting the sludge to the varying pressures in the sidestream. This can conveniently be done by withdrawing the stream for oxygenation from a settling tank for separating activated sludge from oxygenated sewage.

If the introduction of oxygenating gas into the pressurised aqueous material is effected is such a manner that the undisslved oxygenating gas entrained therein is in the form of bubbles of a size close to that required in the volume to be treated the velocity of the oxygenated stream entered the volume can be correspondingly reduced. This in turn reduces the likelihood of causing damage to the contents of the aqueous material.

Introduction of the oxygenated stream into the volume of aqueous material in a turbulent condition is important for ensuring that the undissolved oxygenating gas is present in the form of fine bubbles and thus permits the fine bubbles to dissolve or be consumed by the aqueous material before reaching its upper surface.

Although much of the energy imparted to the aqueous material by the pressurising step is converted into turbulence either at the point of introduction of oxygenating gas or at the point of introduction of the oxygenated stream into the liquor to be treated, another large portion of the energy is taken up in converting the gas phase into small bubbles in the liquor.

The rate at which the oxygenating gas is introduced into the volume of material to be treated depends on the oxygen demand of the material. The proportion of pressurised aqueous material to be oxygenated relative to the volume of aqueous material to be treated similarly varies according to the oxygen demand of the material and according to the particular system. The possibility of monitoring the oxygen demand of the aqueous material and making appropriate adjustments in the rate of oxygenation as the demand varies makes the present procedure particularly attractive.

The direction in which the pressurised oxygenated stream is introduced into the volume varies according to the material to be treated and the system containing it. Thus in a river or other naturally flowing stream the oxygenated liquor is preferably introduced at right angles to the direction of flow of the stream. This ensures treatment of a wider channel of water than would occur with introduction parallel to the flow. If more than one inlet is employed for introducing oxygenating liquor into the river the inlets are preferably arranged in a V-shape patern with the apex of the V in an upstream direction relative to the flow.

The process of the invention provides a means of calculating the rate of flow of the river or stream by introducing a known amount of oxygen at one point and measuring the change in oxygen content at one or more downstream points.

With a tank containing aqueous liquor for sewage treatment or fish farming the introduction of oxygenating liquor is preferably effected in a horizontal direction and in the direction of flow, if any, within the tank. One form of sewage treatment tank, known as a Pasveer ditch, comprises a continuous open channel of generally circular shape around which sewage liquor continuously circulates In such a tank the oxygenating liquor is preferably introduced at several points across the width of the channel and around the periphery the introduction at each point being such as to assist flow around the channel.

Sewage treatment processes are usually operated continuously by maintaining a continuous inlet of waste material to a treatment vessel and a continuous outlet of treated waste material from the treatment vessel. The treatment vessel is preferably an open tank. If desired a plurality of treatment vessels connected to each other in parallel, in series or in series-parallel arrangement can be employed and the oxygenated stream may be distributed between the tanks. One or more streams may be withdrawn for oxygenation. An initial separation of coarse solids from the sewage can be performed prior to the introduction of the sewage into the treatment vessel.

The presence of dissolved oxygen in the sewage liquor encourages the formation of activated sludge in the treatment vessel. In order not to dispose of this beneficial activated sludge with the treated sewage, it is desirable to pass the sewage after it has been oxygenated into one or more settling tanks to separate the activated sludge and leave a clear liquid fit for disposal. At least part of the separated activated sludge is preferably recycled to the or each treatment vessel.

It is advantageous to pass any surplus sludge into a vessel in which it is treated or digested with oxygen or air to degrade the surplus sludge at least partialy so as to facilitate is disposal. The degradation may be effected, according to the present invention, by taking a stream of the surplus sludge, pressurising the stream, oxygenating the compressed stream by introducing a stream of oxygenatig gas into the pressurised steam so as to dissolve therein at least part of the oxygen, and introducing the compressed oxygenated stream in the above-specified manner into a volume of the surplus sludge. This enables the attainment of a more rapid and efficient degradation of the surplus sludge than can be achieved with conventional anaerobic digestion methods.

According to another aspect of the present invention, we have devised a process which enables a treatment vessel to be used to perform both the oxygen treatment and the settling of the activated sludge.

This process comprises the sequential steps of:
(i) passing a volume of aqueous material into a treatment vessel or vessels and withdrawing a stream of aqueous waste material from the volume, pressurising the stream, oxygenating the pessurised stream by introducing a stream of oxygenating gas into the pressurised stream, and introducing the pressurised oxygenated stream by the process of the invention into the aqueous waste material contained in the or each vessel;
(ii) discontinuing the introduction of the pressurised, oxygenated stream into the or each vessel and leaving the aqueous waste material in the or each vessel to stand so as to permit activated sludge to settle toward the bottom of the or each vessel thereby leaving mainly clear supernatant liquid and
(iii) discharging at least part of the mainly clear liquid from the or each vessel.

Surplus sludge can when necessary be withdrawn from the bottom of the or each treatment vessel during step (ii) of the process.

The volume of aqueous waste material may advantgeously be treated by a process including a number of sequential stages, each stage comprising the said steps (i) to (iii). This multi-stage process facilitates the attainment of good conditions for the biodegredation of the aqueous waste material.

Existing sewage treatment plants including a sequene of channels in which the sewage is treated can readily be adapted to perform the multistage process according to the present invention.

In a treatment process according to the present invention aqueous material can be pretreated with air before the treatment with oxygenating gas. Such as pretreatment is useful in stripping any volatile impurities contained in the aqueous material. In sewage treatment, activated sludge can if desired be used in the pretreatment.

It is preferred to monitor the dissolved oxygen concentration of the volume of aqueous material being treated in the treatment vessel or vessels so as to ensure that it remains at a sufficiently high level. A dissolved oxygen meter may be used for this purpose. When the dissolved oxygen meter indicates that the dissolved oxygen concentration of the volume being treated has fallen to a chosen value a further oxygenation is effected to restore the oxygen content to a desired level. Preferably the discontinuation and the initiation of the oxygenation of the aqueous material is effected automatically.

If desired, the period or periods of oxygen treatment can be of a set duration.

The or each treatment or pretreatment vessel in a sewage treatment installation is preferably an open-vented tank but is preferably insulated so as to reduce any cooling effects from the atmosphere. The provision of insulation is particularly desirable if the tank is mounted in the open air. Similarly the top of the tank is preferably provided with a cowl to reduce heat losses. The cowl is preferably of a transparent or heat absorbent material so as to permit heating of the contents of the tank by radiation from the sun. Heating elements can be included in the tank to maintain a high working temperature.

In fish farming the use of a covered tank, e.g. an open-vented tank with a cowl, has the advantages of keeping out predators, unwanted organisms such as certain algae and bacteria and inorganic airborne dirt and in assisting control of the lighting and temperature conditions in the tank. The optimum temperature depends on the particular fish being bred or grown. In the case of trout it is preferably maintained in the range 10° to 14° C.

If the aqueous stream to be oxygenated is withdrawn from the volume of material to be treated, care must be taken when removing the stream for oxygenation not to damage the contents of the volume to be treated. Thus in fish farming and in river oxygenation the point of withdrawal of the stream is protected, typically with a mesh barrier, so as to prevent fish being drawn into the stream to be oxygenated.

The use of oxygen-enriched gas has the great advantage over the use of air that it reduces the risk of achieving supersaturated nitrogen levels in the system. Indeed, provided the oxygen content of the oxygenating gas is above our preferred limit of 80% this possibility can be discounted. In fish farming the avoidance of high nitrogen contents is particularly desirable since supersaturated nitrogen can be harmful, or even fatal, to the fish. A system that injected air into a pressurised stream and introduced the pressurised stream into a fish tank would lead to super-saturation of nitrogen in the tank and thus cannot be contemplated.

Oxygenation of water in a fish tank permits a greater density of fish in the water than in a comparable tank fitted with an aerator. The presence of the additional oxygen appears to increase the appetite of the fish, thereby increasing the quantity of food consumed by the individual fish and thus increasing its rate of growth.

The filtered stream can if desired be additionally passed through a biological filter before being returned to the fish growing tank. It is possible to use chlorinated tap water as the source of water for the tank provided that steps are taken to reduce the chlorine content for example by spraying or by aeration, before introducing the water into the tank. The tank is preferably circular and the water is preferably introduced so as to induce and maintain a continuous flow of water around the tank. This can be achieved by directing the filtered stream into the tank at a point near to its circumference, preferably just above the upper surface of the water and in a direction tangetial to the circumference at that point. Top-up water is preferably introduced in a complementary direction. The oxygenated stream is preferably introduced very close to the base of the tank so as to make full use of the depth of water in the tank for solution or consumption of the undissolved oxygen introduced in the oxygenated stream.

Suitable construction materials for the fish tank are expanded plastics materials, for example polystyrene or polyurethane. The roof of the fish tank can be of any lightweight plastics material.

It is an advantage of the process of the present invention as applied to sewage treatment that existing sewage plants exploying open tanks and channels may readily be converted at relatively low cost to operate the process of this invention. Other treatment processes, however, require enclosed tanks and oxygen recirculation systems which make the costs of convertion of conventional sewage treatment plant prohibitive. It is a further advantage of the invention that the stirring action created by the injection of the pressurised stream can assist or replace mechanical stirring systems.

Another advantage of the process of the present invention is that it can be applied effectively to plant including a treatment vessel of relatively small depth.

It is an advantage of an activated sludge treatment process according to the present invention that sludge concentration of some 20,000 ppm or more may be maintained in a treatment vessel during oxygen treatment of aqueous material contained therein.

The invention will now be described in way of example, with reference to the accompanying drawings, in which:

FIG. 5 is a general perspective view of the fish farming installation FIG. 6 is an elevation, partly in section, of a fish tank with associated filtration and side-stream oxygenation equipment and, FIG. 7 is a plan view of the fish tank shown in FIG. 6.

Figure 1:
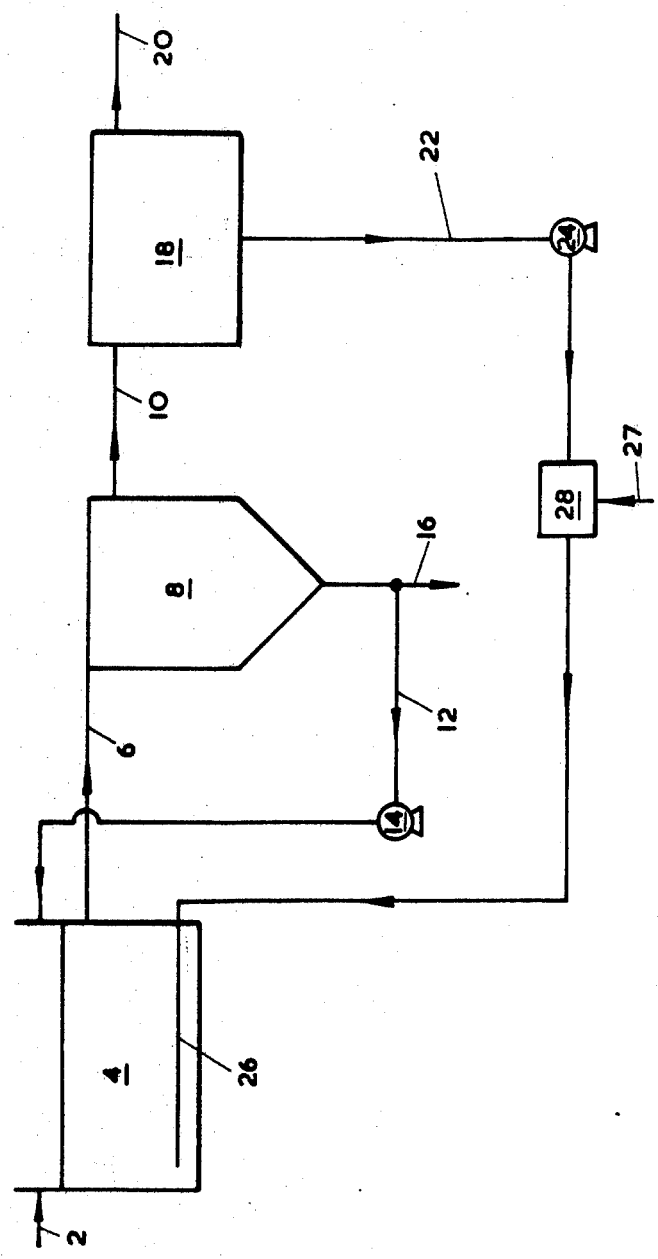
FIGS. 1 to 4 are all schematic diagrams of forms of sewage treatment plant for performing the process according to the invention.

In the sewage treatment plant shown in FIG. 1, a sewage inlet pipe 2 leads to an open treatment tank 4. Treated sewage from the tank 4 is passed via pipe 6 into a settling tank 8, in which treated sewage is separated from activated sludge. The treated sewage is passed out of the tank 8 through a pipe 10 into a tank 18, and a proportion of the liquid collected in the tank 18 passed through pipe 20 for further treatment or disposal.

Settled activated sludge is withdrawn from the bottom of the tank 8 along pipe 12 by means of pump 14 into the treatment tank 4. Surplus can be withdrawn for disposal from the tank 8 through line 16.

The oxygenation of the sewage in the tank 4 is effected as follows. A portion of the clear liquid in the tank 18 is withdrawn through a pipe 22 by means of a pump 24 which pressurises the withdrawn liquid to within the range 40 to 80 psig.

Gaseous oxygen from an inlet conduit 27 is sparged into the pipe 22 in a chamber 28 just downstream of the pump 24, and the oxygenated liquid is injected into the treatment tank 4 through a sparge pipe 26 having several orifices each of 6 mm diameter formed therein. The pipe 26 is disposed in the tank 4 such that the orifices inject the oxygenated liquid, and oxygen gas entrained therein, horizontally into the sewage to be treated.

The sparge pipe 26 injects the oxygenated water into the sewage in the treatment tank 4 in the form of several "jets" of liquid with fine bubbles entrained therein. The effect of these "jets" is to agitate the sewage in the tank 24. It is found that substantially all the oxygen is dissolved in the liquor.

The amount of oxygen required to treat a given flow rate of sewage through the plant can be calculated if the value of the biological oxygen demand (BOD) of the incoming sewage and the value required for the treated liquid disposed through pipe 20 are known. The ratio of the rate of disposal of treated liquid from the tank 18 through the pipe 20 to the rate of recirculation of treated liquid for oxygenation from the tank 18 through the pipe 26 can then be determined. This ratio may be varied widely according to the biological oxygen demand of the incoming sewage. If there is a relatively small demand for the recirculation of liquid, the tank 18 can be operated to ensure that the pump 24 does not withdraw excess liquid.

Figure 2:
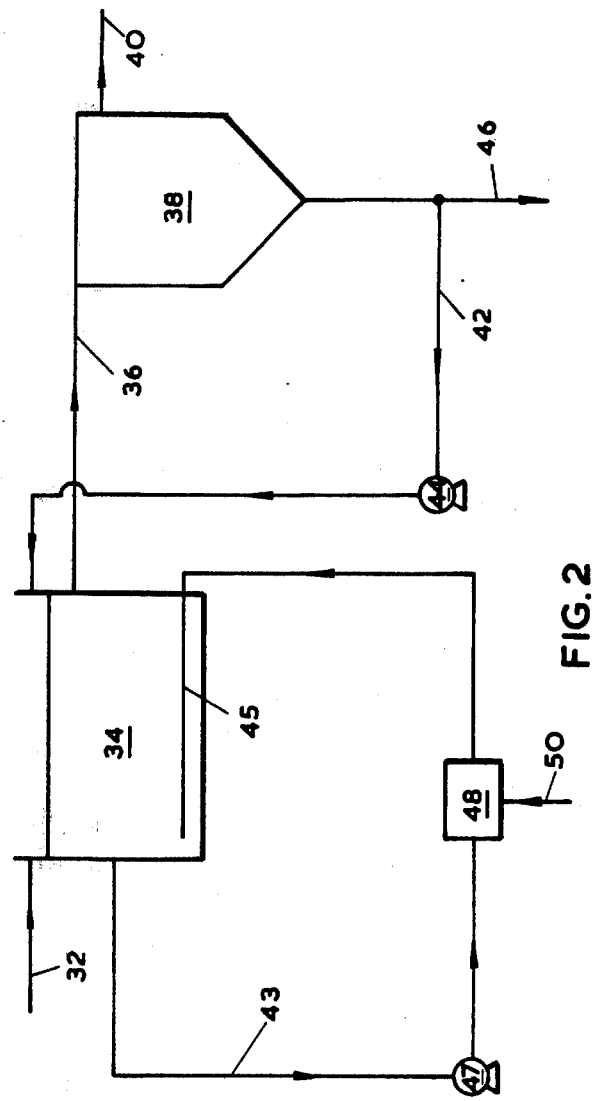

In the sewage treatment plant shown FIG. 2, a sewage inlet pipe 32 leads to an insulated open-topped treatment tank 34. Treated sewage from the tank 34 is passed via a pipe 36 into a settling tank 38 inches which treated sewage is separated by gravity from activated sludge. The treated sewage from which the activated sludge has been separated is passed out of the tank 38 through a pipe 40 for disposal or further treatment. The liquid passing through the pipe 40 is found to be substantially clear and free from solids.

Settled activated sludge is withdrawn from the bottom of the tank 38 along a pipe 42 by means of a pump 44 and reintroduced into the treatment tank 34. Surplus sludge that is formed during the process can be withdrawn from the tank 38 via pipe 46 and be disposed of in an appropriate manner, for example by aerobic digestion.

The oxygenation of the sewage in the tank 34 is effected as follows. A portion of the liquid from the tank 34 is withdrawn through a pipe 43 by means of a pump 47 which pressurises the withdrawn liquid to within the range 40 to 80 psig.

Gaseous oxygen or enriched air supplied via a pipeline 50 is injected into a chamber 48 just downstream of the pump 46 and the so-formed oxygenated liquid is injected into the treatment tank 34 through a sparge pipe 45 having several orifices of 6 mm diameter formed therein. The pipe 45 is disposed in the tank 34 such that the orifices inject the oxygenated liquid, together with undissolved oxygen entrained therein, horizontally into the sewage to be treated.

The sparge pipe 45 injects the oxygenated water into the sewage in the treatment tank in the form of several "jets" of liquid with fine bubbles entrained therein. The effect of these "jet" is to agitate the sewage in the tank 4. It is found that substantially no bubbles rise to the surface of the sewage in the treatment tank indicating that substantially all the oxygen introduced into the treatment tank is dissolved in the sewage being treated therein.

A stream of sewage to be treated may be passed into the treatment tank 34 continuously, and similarly a stream may be withdrawn continuously from the tank 34 via the pipe 36. To conserve power the injection of the oxygenated and pressurised liquid into the sewage in the treatment tank 34 may be discontinued if the dissolved oxygen content of the sewage in the treatment tank rises above a chosen value (for example to 8 ppm).

Figure 3:
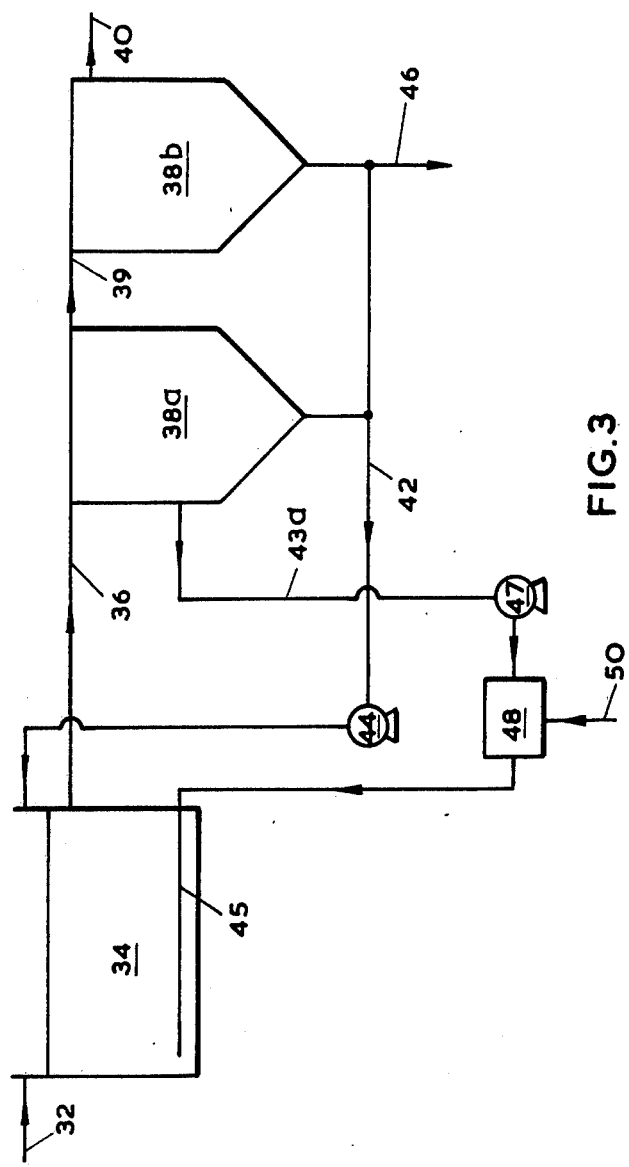

The plant shown in FIG. 3 is similar to that shown in FIG. 2 in all but two respects. First, the plant employs two settling tanks 38A and 38B connected in series by a pipe 39. Secondly the stream to be compressed and then oxygenated is withdrawn via a line 43a from the tank 38A, and not from the treatment tank 34 as shown in FIG. 2. This has the advantage that a clear liquid is withdrawn and consequently there is no risk of damaging the activated sludge in the pump 47. On the other hand more work is required to be done by the pump 47 to withdraw the stream at a chosen rate than is required to be done by the pump to withdraw the stream at the same rate from the plant shown in FIG. 2.

Figure 4:
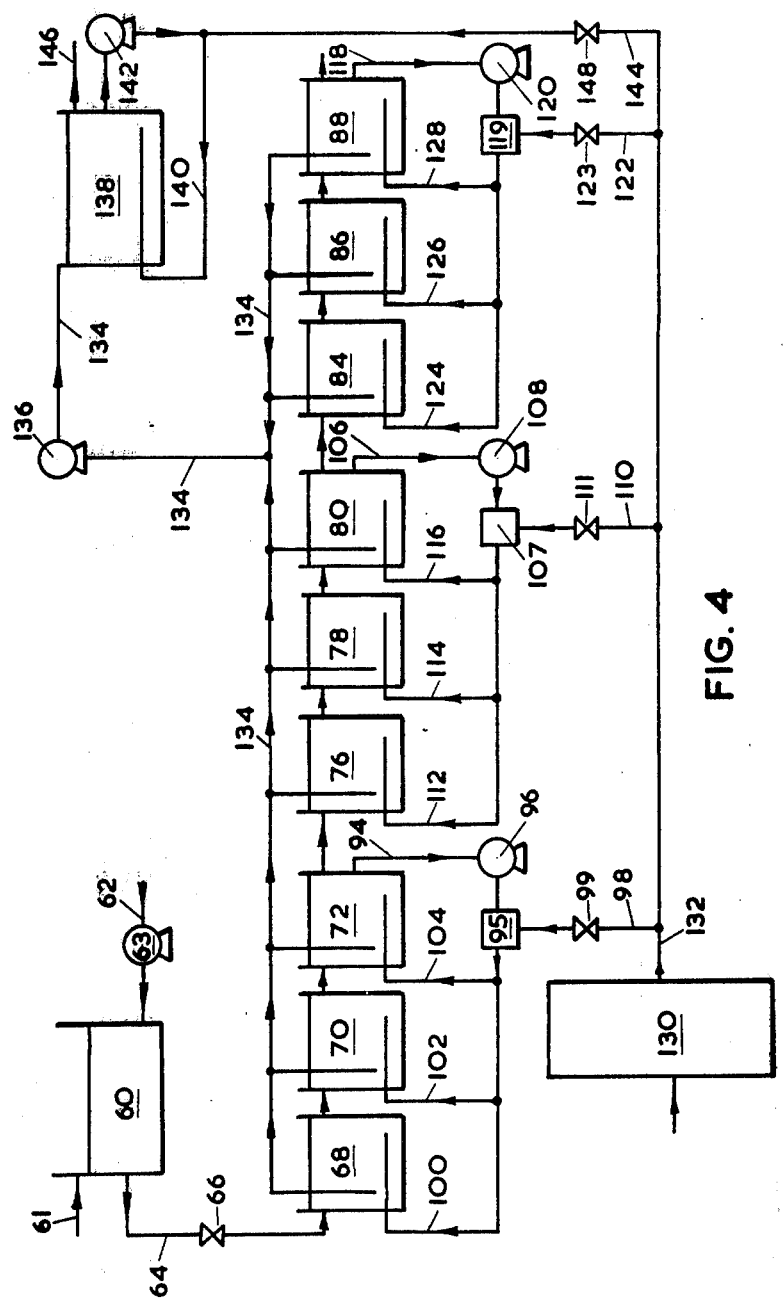
Figure 5:
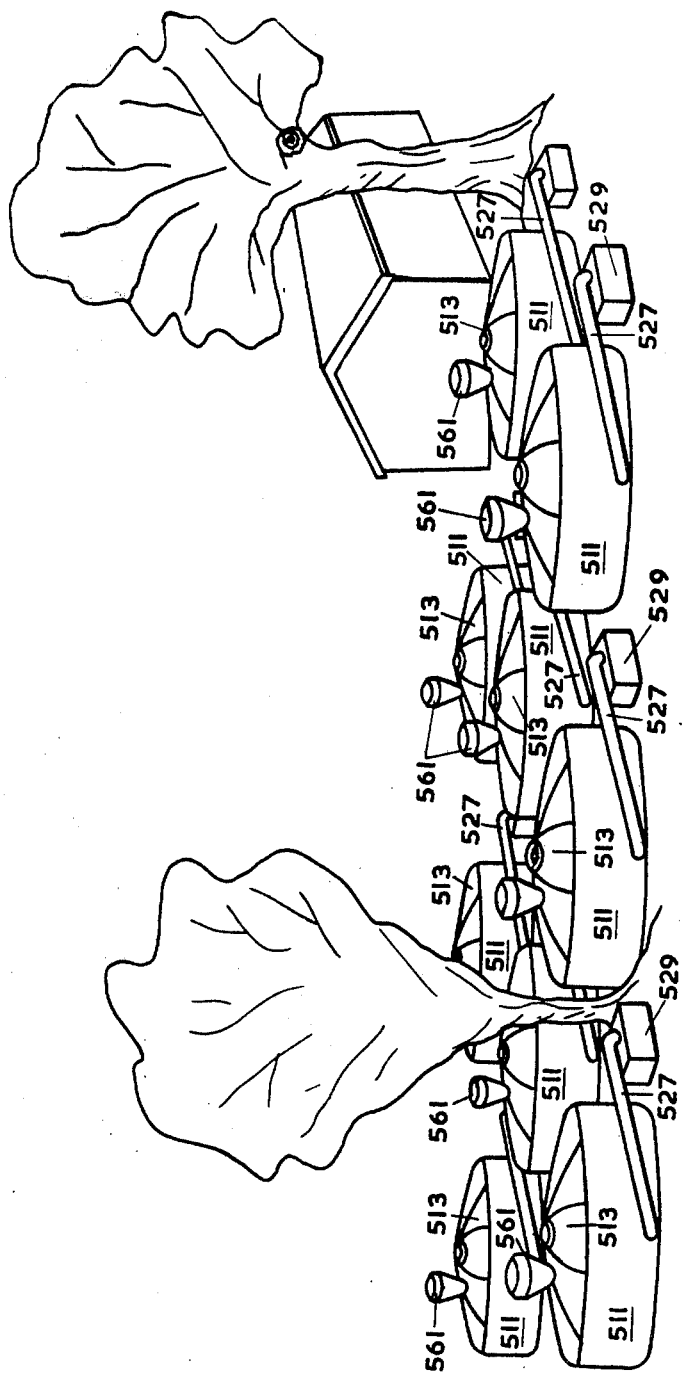
FIGS. 5 to 7 are drawings of one form of fish farming installation to which the process of the invention can be applied

The sewage treatment plant shown in FIG. 4, includes an inlet pipe 61 through which incoming sewage to be treated is passed into an open stripping tank 60. The sewage in the tank 60 is blown with air to strip any volatile hydrocarbons therefrom. The air flow required for this process is provided by blower 63 located in an air inlet conduit 62 leading to the tank 60.

An outlet pipe 64 connects the tank 60 to a series of open-topped insulated treatment tanks 68, 70, 72, 76, 78, 80, 84, 86 and 88. In these tanks the sewage is treated by an activated sludge-oxygen process according to the present invention. This activated sludge-oxygen process has three stages. The first stage is performed in the tanks 68, 70, and 72, the second stage in the tanks 76, 78 and 80, and the third stage in the tanks 84, 86 and 88.

In the first stage of the treatment an appropriate volume of the sewage is admitted to the tanks 68, 70 and 72, which are connected in series with one another, by opening a control volve 66 located along the pipe 64. A stream of the sewage to be treated is withdrawn from the tank 72 along a pipe 94 and pressurised to about 60 psig in a pump 96. Downstream of the pump 96 oxygen or oxygen-enriched air is injected into the pressurised stream in a chamber 95. The oxygen or oxygen-enriched air is supplied from an air separation unit 130 along pipes 132 and 98. The pressurised oxygenated stream so formed is then divided amongst pipes 100, 102 and 104 and sparged into the tanks 68, 70 and 72 respectively. The oxygen so introduced into the sewage in the tanks 68, 70 and 72 increases the dissolved oxygen concentration of that sewage and promotes the formation of activated sludge.

After the expiry of a chosen period or upon the dissolved oxygen content of the sewage in the tanks 68, 70 and 72 reaching a chosen value of the oxygen treatment is discontinued by switching off the pump 96 and closing a control valve 99 in the pipe 98. The aqueous material in the tanks 68, 70 and 72 is then permitted to stand for a chosen period. This permits settling of the activated sludge which is thoroughly mixed with the liquid in the tanks during the oxygen treatment, and thereby enables a clear liquid to be passed to the next stage of the process.

At the end of the settling period clear liquid from the tanks 68, 70 and 72 is passed over an outlet weir (not shown) in the tank 72 and introduced into the next three tanks 76, 78 and 80. In these tanks the liquid is subjected to a second stage activated sludge-oxygen treatment process generally similar to that performed in the tanks 68, 70 and 72. The stream to be oxygenated is withdrawn from the tank 80 through a pipe 106 and compressed in a pump 108. The compressed stream is oxygenated by oxygen or oxygen-enriched air which is derived from the air separation unit 130, passed into pipes 132 and 110 and then injected into the pressurised stream in a chamber 107. The so-formed pressurised oxygenated stream is then sparged into the liquid in the tanks 76, 78 and 80 through pipes 112, 114 and 116 respectively. When the desired oxygenation has been performed a control valve 111 in the pipe 110 is closed and the pump 108 is switched off. Settling then occurs out in the tanks 76, 78 and 80, and the clear liquid so-formed passed over an outlet weir (not shown) in the tank 80 into the tanks 84, 86 and 88 for a third stage treatment.

The third stage is generally similar to the first two stages. The stream to be oxygenated is withdrawn from the tank 88 through a pipe 118 and pressurised in a pump 120. The pressurised stream is oxygenated by oxygen or oxygen-enriched air derived from the separation unit 130 from which it is passed into pipes 132 and 122 and then injected into the pressurised stream in a chamber 119. The so-formed pressurised oxygenated stream is then sparged into the liquid in the tanks 76, 78 and 80 through pipes 124, 126 and 128 respectively. When the desired oxygenation has been performed a control valve 123 in the pipe 122 is closed and the pump 120 is switched off. Settling then occurs in the tanks 84, 86 and 88, and the clear liquid so-formed passes over an outlet wier (not shown) in the tank 88 and is discharged.

In operating the three stages of the oxygen-activated sludge treatment it is preferred that the period of oxygenation in all three stages is the same and similarly that the period allowed for settling in all three stages is the same. This permits simultaneous use of the three stages. It may therefore be desirable to set the rate of withdrawal of the stream to be oxygenated and hence the rate of oxygenation in accordance with the value of dissolved oxygen concentration of the aqueous material entering a stage and the value desired for the aqueous material leaving the stage.

During settling periods surplus activated sludge can be withdrawn by means of a pump 136 from the treatment tanks via pipes 134, and introduced into an open aerobic digestion tank 138, in which it is treated with oxygen to facilitate its degradation. A stream of the material to be degraded is withdrawn from the tank 138 and pressurised to about 60 psig in a pump 142. By opening a valve 148 oxygen or oxygen-enriched air can be passed from the air separation unit 130 along pipe 144 and then injected into the pressurised stream at a region downstream of the pump 142. The so-formed pressurised oxygenated stream is then sparged through an inlet pipe 140 into the material contained in the tank 138.

Degraded material fit to be disposed may be discharged from the tank through the outlet pipe 146.

Figure 6:
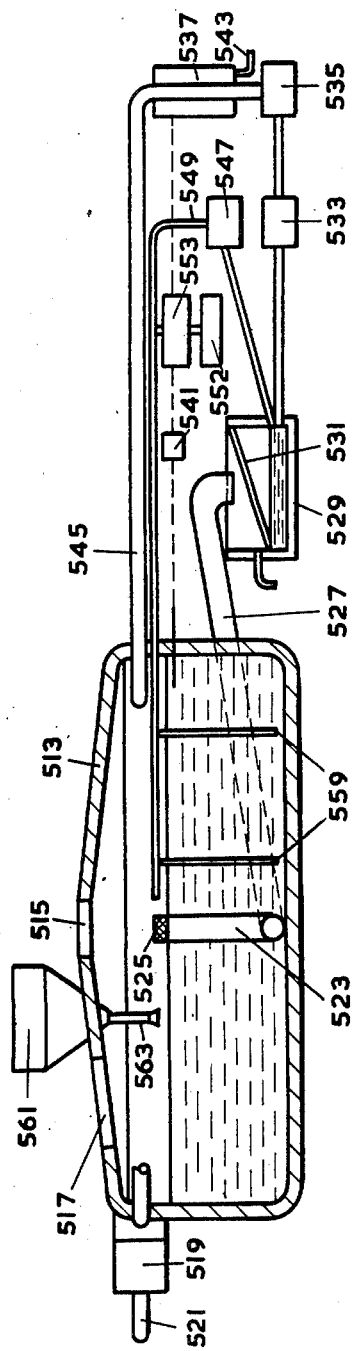
Figure 7:
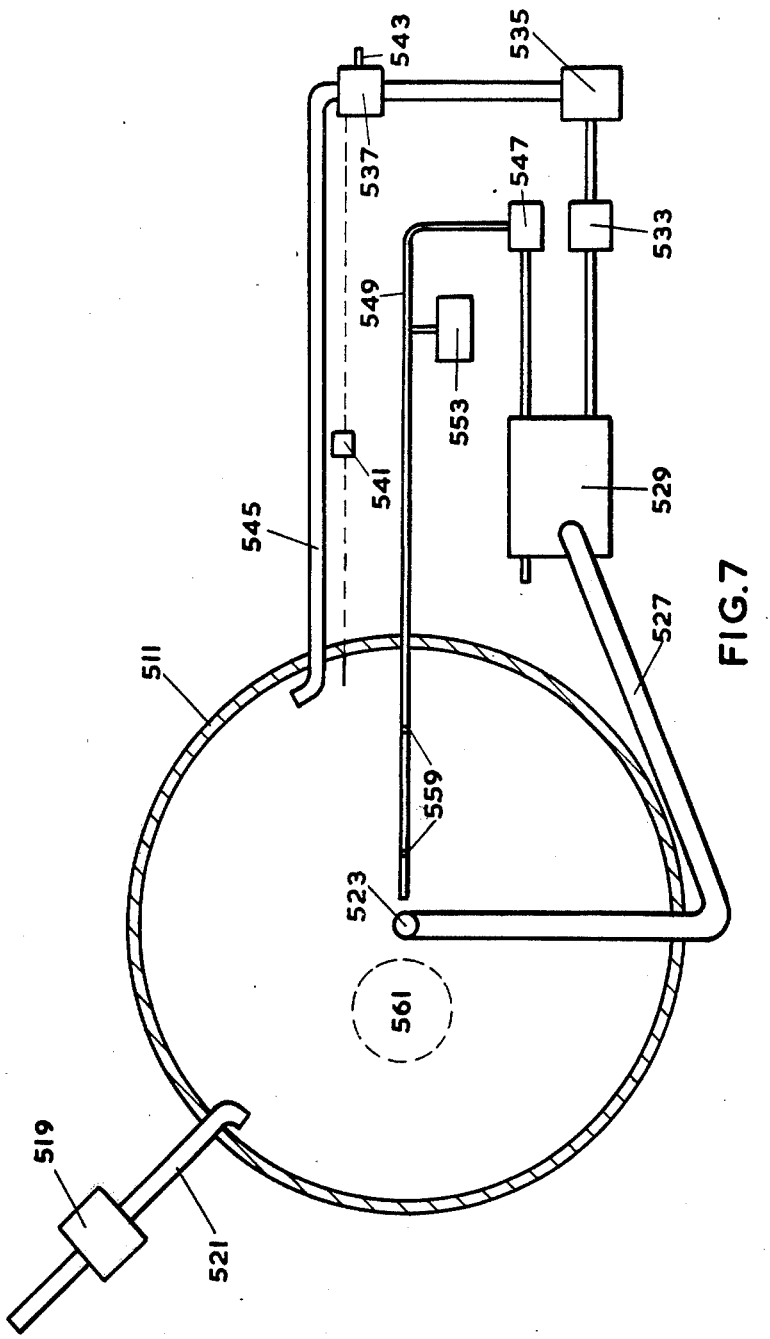

In FIGS. 6 and 7 the relative disposition of the constituent parts is somewhat diagrammatic, in order to make for easier understanding of the apparatus. The installation includes several fish tanks 11 constructed of expanded polystyrene and each having a lightweight glass fibre roof 513. The roof is fitted with an inspection hatch 515 and large removable hatches 517 to permit the netting of fish at the desired stages.

In the installation shown in FIGS. 6 and 7 the supply of water to fill the tank and to keep it full is chlorinated water from the local water authority. This is pressed through an aerator 519 and then through a tangential inlet 521 in the upper part of the tank 511. The tangential introduction of water creates and maintains a continuous circulation around the tank.

In the centre of the tank 511 a vertical outlet duct 523 fitted with a cylindrical mesh guard 525 acts as an overflow pipe. A conduit 527 leads from the pipe 523 to a filter unit 529 provided with an inclined screen 531. The bulk of the water passes through the screen 531 but the remainder, with associated solid waste, is removed from the lower end of the screen 531 and discharged. The proportion of water discarded is generally 10% or less or the volume leaving conduit 527. Of the water passing through the screen 531 the major part is taken to a pump 533 from which it is returned to the tank 511 through a biological filter 535 and a heater unit 537. The heater unit 537 is controlled by a temperature-detecting probe 539 linked to thermostat 541. The heater 537 is a conventional water heater supplied by propane gas through a conduit 543. The filtered, and possibly heated, stream is returned to the tank 511 through a tangential inlet 545.

A minor part of the liquor passing through screen 531 is pressurised in a pump 547 and passed through a conduit 549 to an oxygenation station 551. This includes a liquid oxygen tank 552, an evaporator 553 and a conduit 555 leading therefrom to an orifice 557 mounted centrally in the conduit 549. The conduit 555 is disposed such that the oxygen is introduced in a downstream direction parallel to the flow of liquor in the conduit 549. Downstream of the orifice 557 the conduit 549 continues in a horizontal direction to the centre of the tank 511. In the embodiment shown, two vertical conduits 559 depend from the horizontal conduit 549 and rest on the base of the tank 511. An orifice of 6 mm diameter and located to oppose the direction of flow of water in the tank 511 is provided in each conduit 559 the lower part of the orifice being 12 mm above the base of the tank 511.

A food hopper 561 is mounted above the tank 511 and a valve duct 563 leads vertically downwards from the hopper 561 to a point just above the water surface in the tank 511.

In typical operations with such a tank the volume of water removed through conduit 523 over a period of 24 hours is equal to the volume of water in the tank. Of the water leaving the filter screen 531, 10% is discarded, 85% is filtered and returned to the tank 511 and 5% is filtered, oxygenated and returned to the tank 511. The velocity of water passed the oxygen inlet station 551 is 5 feet per second and is at a pressure of 75 psig. The water level in the tank is maintained by continuous introduction of feed water through inlet 521. The oxygen is introduced at a pressure 5 psi above that of the stream to be oxygenated. The water temperature in the tank is maintained 10° to 14° C.

I claim:

1. In a process for providing a dissolving within a body of liquid at generally atmospheric pressure a gas which is sparingly soluble in the liquid by removing a portion of the liquid as a stream of liquid, and pressurizing the stream of liquid during introduction of the sparingly soluble gas into the stream of liquid prior to introduction of the pressurized stream of liquid back into the body of liquid, the improvement which comprises the steps of:

(a) passing the pressurized stream of liquid through a conduit and introducing the gas into the conduit under turbulent conditions as a substantially inner gas phase of undissolved gas bubbles at a rate to provide in the pressurized stream 100% to 1500% by weight of undissolved gas in excess of the equilibrium saturation value of said gas in said liquid at the pressure of said pressurized stream to establish a gas-in-liquid dispersion comprising finely dispersed bubbles of undissolved gas which are carried within the pressurized stream of liquid in the conduit without any significant formation of a discrete vapor phase or significant dissolution of said dispersion in the conduit;

(b) maintaining the rate of flow of the liquid in the conduit at least at a minimum limiting value at which the bubbles of undissolved gas comprising the gas-in-liquid phase carried in the pressurized stream do not combine to form a significant vapor phase in the conduit;

(c) maintaining the excess of the equilibrium saturation of (a) in the conduit until immediately prior to introduction of the pressurized stream of (a) back into the body of liquid; and (d) introducing the pressurized stream containing the finely dispersed bubbles of undissolved gas of (a) as maintained in (b) and (c) back into the body of liquid under turbulent conditions so that the finely dispersed bubbles of undissolved gas are sheared into even finer bubbles which either dissolve or are dispersed as a generally discrete gas-in-liquid phase within the body of liquid before any significant amount of dispersed gas reaches the surface of the body of liquid.

2. A process as claimed in claim 1 wherein the amount of gas introduced into the pressurized stream is in the range of 300% to 1000% by weight in excess of the equilibrium saturation value of the gas at the pressure of the pressurised stream.

3. A process as claimed in claim 2 wherein the gas is an oxygenating gas and the liquid is aqueous material which is pre-treated wth air before the treatment with the oxygenated pressurized stream.

4. A process as claimed in claim 1 wherein the proportion of undissolved gas to dissolved gas in the pressurized stream in the conduit is in the range 1:20 to 1:1 by weight.

5. A process as claimed in claim 1 wherein the diameter of the finely dispersed bubbles of undissolved gas in the stream in the conduit is in the range 0.2 to 2 mm.

6. A process as claimed in claim 1 wherein the diameter of the majority of the bubbles in the body of liquid of (c) are in the range 0.01 to 0.15mm.

7. A process as claimed in claim 1 wherein the liquid is an aqueous liquor and the treatment gas is an oxygenating gas.

8. A process as claimed in claim 7 wherein the oxygenating gas has an oxygen content of at least 80%.

9. A process as claimed in claim 7 wherein the oxygenating gas includes ozone.

10. A process as claimed in claim 7 wherein the treatment gas includes chlorine.

11. A process as claimed in claim 7 wherein the ratio of the volume of gas introduced (measured in standard units) to the volume of pressurised liquid passing in unit time at the point at which the gas is introduced into the liquid is within the range 1:20 to 1:2.

12. A process as claimed in claim 7 wherein the liquid is aqueous material containing activated sludge which is allowed to settle following treatment with oxygenated liquor to permit the discharge of at least part of the mainly clear supernatant liquid thereby produced.

13. A process as claimed in claim 1 wherein the pressure of the liquid pressurized stream is within the range 0.3 to 200 psig.

14. A process as claimed in claim 1 wherein the pressure of the liquid stream is within the range 20 to 80 psig.

15. A process as claimed in claim 14 wherein the pressure of the liquid pressurized stream is within the range 25 to 50 psig.

16. A process as claimed in claim 1 wherein the treatment gas is introduced into the pressurized stream in a venturi.

17. A process as claimed in claim 1 wherein the volume of treatment gas introduced in unit time is controlled by a dissolved oxygen meter in aqueous material to be treated.

18. A process as claimed in claim 1 wherein the pressure of the stream to be treated is within the range 20 to 80 psig and the pressurized stream with dissolved and undissolved gas is introduced back into the body of liquid through one or more orifices each having a diameter in the range 6 to 12 mm.

19. A process for treating sewage liquors which comprises the sequential steps of:

(i) passing a volume of sewage liquor into a treatment vessel or vessels and withdrawing a stream of aqueous waste material from the volume, pressurising the stream, oxygenating the pressurised stream by introducing a stream of oxygenating gas into the pressurised stream, and introducing the pressurised oxygenated stream by a process as claimed in claim 1 into the aqueous waste material contained in the or each vessel:

(ii) discontinuing the introduction of the pressurised, oxygenated stream into the or each vessel and leaving the aqueous waste material in the or each vessel to stand so as to permit activated sludge to settle toward the bottom of the or each vessel thereby leaving mainly clear supernatant liquid and (iii) discharging at least part of the mainly clear liquid from the or each vessel.

20. A process as claimed in claim 1, wherein the liquid is aqueous sewage liquor containing activated sludge and the process is conducted so as to degrade the activated sludge.

* * * * *